(12) United States Patent
Emigh et al.

(10) Patent No.: US 11,715,943 B2
(45) Date of Patent: Aug. 1, 2023

(54) FACEPLATE FOR MULTI-SENSOR CONTROL DEVICE

(71) Applicant: Brilliant Home Technology, Inc., San Mateo, CA (US)

(72) Inventors: Aaron T. Emigh, San Mateo, CA (US); Brian Cardanha, San Mateo, CA (US); Iris Yan, San Mateo, CA (US); David Tyndall, San Mateo, CA (US); Elijah Kim, San Mateo, CA (US)

(73) Assignee: Brilliant Home Technology, Inc., San Mateo, CA (US)

( * ) Notice: Subject to any disclaimer, the term of this patent is extended or adjusted under 35 U.S.C. 154(b) by 227 days.

(21) Appl. No.: 17/142,136

(22) Filed: Jan. 5, 2021

(65) Prior Publication Data

US 2021/0210939 A1      Jul. 8, 2021

Related U.S. Application Data

(60) Provisional application No. 62/957,305, filed on Jan. 5, 2020.

(51) Int. Cl.
*H02G 3/14*      (2006.01)
*H05B 45/10*     (2020.01)

(52) U.S. Cl.
CPC .............. *H02G 3/14* (2013.01); *H05B 45/10* (2020.01)

(58) Field of Classification Search
CPC .......... H02G 3/14; H02G 3/081; H05B 45/10; H05B 45/00; H05K 5/03; G01D 11/24; G01D 11/245

USPC ...... 174/66, 67; 220/241, 242; 439/536, 535
See application file for complete search history.

(56) References Cited

U.S. PATENT DOCUMENTS

| | | |
|---|---|---|
| 4,246,494 A | 1/1981 | Foreman |
| D283,404 S | 4/1986 | Heiler |
| 4,591,765 A | 5/1986 | Beck |
| D285,066 S | 8/1986 | Liss |
| D288,921 S | 3/1987 | Peck |
| D297,508 S | 9/1988 | Yandek |
| D308,045 S | 5/1990 | Counts |
| D311,382 S | 10/1990 | Mayo |
| D311,485 S | 10/1990 | Jacoby |
| D312,974 S | 12/1990 | Conner |
| D313,592 S | 1/1991 | Morooka |
| D313,738 S | 1/1991 | Mayo |

(Continued)

FOREIGN PATENT DOCUMENTS

| | | |
|---|---|---|
| CN | 101999253 A | 3/2011 |
| CN | 105121228 A | 12/2015 |

(Continued)

OTHER PUBLICATIONS

International Search Report and Written Opinion from PCT Application No. PCT/US18/12273, dated Apr. 19, 2018, 7 pages.

(Continued)

*Primary Examiner* — Angel R Estrada
(74) *Attorney, Agent, or Firm* — Zurvan Mahamedi

(57) ABSTRACT

A control device and face plate is described, where the faceplate includes a first region formed from a first material that is non-conductive, a second region that is formed a second material that is transparent to infrared radiation, and where the first region and the second region are seamlessly joined to form a unitary structure.

14 Claims, 3 Drawing Sheets

(56) References Cited

U.S. PATENT DOCUMENTS

| | | |
|---|---|---|
| D319,429 S | 8/1991 | D'Aleo |
| D322,606 S | 12/1991 | Muller |
| D343,381 S | 1/1994 | Inukai |
| D344,684 S | 3/1994 | Metz |
| D346,591 S | 5/1994 | Lee |
| D348,070 S | 6/1994 | Vallillee |
| 5,336,979 A | 8/1994 | Watson |
| D359,459 S | 6/1995 | Summa |
| D360,235 S | 7/1995 | Emrys-Roberts |
| D362,252 S | 9/1995 | Ansell |
| D364,141 S | 11/1995 | Hanna |
| D365,029 S | 12/1995 | Gaskell |
| D366,217 S | 1/1996 | Dudley |
| 5,637,863 A | 6/1997 | Sanborn |
| D386,986 S | 12/1997 | Gee, II |
| D395,639 S | 6/1998 | Ham |
| D413,073 S | 8/1999 | Brechbill |
| D425,538 S | 5/2000 | Akaike |
| D425,801 S | 5/2000 | Brechbill |
| D452,695 S | 1/2002 | Miller |
| D454,870 S | 3/2002 | Lee |
| D461,802 S | 8/2002 | Tu |
| D478,053 S | 8/2003 | Andre |
| D482,094 S | 11/2003 | Burrows |
| D493,148 S | 7/2004 | Shibata |
| D503,402 S | 3/2005 | Su |
| D505,344 S | 5/2005 | Roher |
| D505,676 S | 5/2005 | Porter |
| 6,888,537 B2 | 5/2005 | Benson |
| D506,151 S | 6/2005 | Roher |
| D514,527 S | 2/2006 | DiPasquale |
| D520,073 S | 5/2006 | Stratton |
| D523,823 S | 6/2006 | McLellan |
| D524,279 S | 7/2006 | Lai |
| 7,084,859 B1 | 8/2006 | Pryor |
| D528,512 S | 9/2006 | Li |
| D528,991 S | 9/2006 | Katsuyama |
| 7,115,856 B2 | 10/2006 | Peng |
| D535,628 S | 1/2007 | Fort |
| D535,951 S | 1/2007 | Fort |
| D536,671 S | 2/2007 | Spira |
| D537,120 S | 2/2007 | Mandel |
| D538,773 S | 3/2007 | Joung |
| D541,800 S | 5/2007 | Ponnert |
| D546,295 S | 7/2007 | Marchetto |
| D551,664 S | 9/2007 | Lin |
| D562,259 S | 2/2008 | Kosche |
| D570,299 S | 6/2008 | Jacoby |
| D572,208 S | 7/2008 | Mayo |
| D572,227 S | 7/2008 | Yoon |
| D572,667 S | 7/2008 | Mayo |
| D574,436 S | 8/2008 | Mandel |
| D585,094 S | 1/2009 | Smith |
| 7,489,303 B1 | 2/2009 | Pryor |
| D589,002 S | 3/2009 | Magoni |
| D595,664 S | 7/2009 | Simard |
| D602,452 S | 10/2009 | Grundker |
| D607,416 S | 1/2010 | Gentner |
| D610,554 S | 2/2010 | Lanfear |
| D614,520 S | 4/2010 | Peters, Jr. |
| D615,045 S | 5/2010 | Lanfear |
| D624,882 S | 10/2010 | Altonen |
| D638,421 S | 5/2011 | Tsai |
| D638,806 S | 5/2011 | Kim |
| D639,804 S | 6/2011 | Hwang |
| D640,992 S | 7/2011 | Margolin |
| D642,572 S | 8/2011 | Kujawski |
| D642,992 S | 8/2011 | Sasaki |
| D643,318 S | 8/2011 | Morrow |
| 8,008,591 B2 | 8/2011 | Shi |
| D645,001 S | 9/2011 | Margolin |
| D647,067 S | 10/2011 | Kim |
| D651,530 S | 1/2012 | Baumgartner |
| D658,591 S | 5/2012 | Margolin |
| D662,837 S | 7/2012 | Morrow |
| D662,838 S | 7/2012 | Morrow |
| D662,839 S | 7/2012 | Morrow |
| D662,840 S | 7/2012 | Morrow |
| D663,224 S | 7/2012 | Morrow |
| D669,866 S | 10/2012 | Gilbert |
| D678,219 S | 3/2013 | Higashijima |
| D679,664 S | 4/2013 | Piche |
| D685,776 S | 7/2013 | Bau |
| D687,389 S | 8/2013 | Baumgartner |
| D689,825 S | 9/2013 | Wenji |
| D690,696 S | 10/2013 | Jonsson |
| D690,697 S | 10/2013 | Jonsson |
| D690,698 S | 10/2013 | Jonsson |
| D691,972 S | 10/2013 | Lin |
| D694,211 S | 11/2013 | Yuu |
| D694,718 S | 12/2013 | Baumgartner |
| D696,635 S | 12/2013 | Asher |
| D701,570 S | 3/2014 | Fletcher |
| D706,230 S | 6/2014 | McMillen |
| D709,055 S | 7/2014 | Cho |
| D710,313 S | 8/2014 | Charleux |
| D716,302 S | 10/2014 | Delgado |
| D717,774 S | 11/2014 | Fathollahi |
| D718,292 S | 11/2014 | Hemesath |
| D718,308 S | 11/2014 | Nishizawa |
| D720,306 S | 12/2014 | Altonen |
| D722,055 S | 2/2015 | Jonsson |
| D723,948 S | 3/2015 | Baumgartner |
| D724,103 S | 3/2015 | Akana |
| D724,547 S | 3/2015 | Baldwin |
| D727,271 S | 4/2015 | Shi |
| D728,527 S | 5/2015 | Kim |
| D732,526 S | 6/2015 | Ferren |
| D732,533 S | 6/2015 | Hirota |
| D733,590 S | 7/2015 | Primiani |
| D735,149 S | 7/2015 | Lin |
| D735,681 S | 8/2015 | Altonen |
| D735,717 S | 8/2015 | Lam |
| D739,399 S | 9/2015 | Adamson |
| D739,400 S | 9/2015 | Adamson |
| D740,762 S | 10/2015 | Miller |
| D743,349 S | 11/2015 | Leeland |
| 9,198,259 B2 | 11/2015 | Hoang |
| D746,280 S | 12/2015 | Bajwa |
| D751,426 S | 3/2016 | Edgar |
| 9,354,751 B2 | 5/2016 | Fisher |
| D761,741 S | 7/2016 | Santiago |
| 9,389,769 B1 | 7/2016 | O'Keeffe |
| D763,205 S | 8/2016 | Kashimoto |
| D766,240 S | 9/2016 | Le Rouzo |
| D766,892 S | 9/2016 | Bajwa |
| D767,553 S | 9/2016 | Fathollahi |
| D773,456 S | 12/2016 | Mitchell |
| D775,089 S | 12/2016 | Iaconis |
| D778,244 S | 2/2017 | Feldstein |
| D781,250 S | 3/2017 | Cartwright |
| D782,471 S | 3/2017 | Nuk |
| 9,655,172 B2 | 5/2017 | Sumi |
| D789,306 S | 6/2017 | VanDuyn |
| D789,897 S | 6/2017 | VanDuyn |
| D824,383 S | 7/2018 | Wall |
| D825,495 S | 8/2018 | Yagisawa |
| D826,180 S | 8/2018 | Stray |
| D827,455 S | 9/2018 | Farenski |
| 10,102,742 B2 | 10/2018 | Dimberg |
| D842,713 S | 3/2019 | Erbacher |
| 10,524,339 B2 | 12/2019 | Hung |
| D873,265 S | 1/2020 | Wall |
| D882,528 S | 4/2020 | Fariello |
| 10,645,777 B2 | 5/2020 | Casey |
| D886,749 S | 6/2020 | Emigh |
| D911,983 S | 3/2021 | Chen |
| 11,209,845 B2 * | 12/2021 | Iaconis .................... H02G 3/12 |
| 2004/0080267 A1 | 4/2004 | Cok |
| 2004/0080682 A1 | 4/2004 | Dalton |
| 2004/0183788 A1 | 9/2004 | Kurashima |
| 2005/0064936 A1 | 3/2005 | Pryor |
| 2005/0168435 A1 | 8/2005 | Reed |
| 2005/0219200 A1 | 10/2005 | Weng |

(56) References Cited

U.S. PATENT DOCUMENTS

| | | |
|---|---|---|
| 2006/0232269 A1 | 10/2006 | Sills |
| 2007/0039810 A1 | 2/2007 | Chou |
| 2007/0097090 A1 | 5/2007 | Battles |
| 2007/0112939 A1 | 5/2007 | Wilson |
| 2007/0291010 A1 | 12/2007 | Altonen |
| 2008/0024463 A1 | 1/2008 | Pryor |
| 2008/0151458 A1 | 6/2008 | Beland |
| 2008/0211779 A1 | 9/2008 | Pryor |
| 2009/0197442 A1 | 8/2009 | Wei |
| 2009/0267921 A1 | 10/2009 | Pryor |
| 2010/0018844 A1 | 1/2010 | Sanford |
| 2010/0141153 A1 | 6/2010 | Recker |
| 2010/0182137 A1 | 7/2010 | Pryor |
| 2011/0037725 A1 | 2/2011 | Pryor |
| 2011/0074672 A1 | 3/2011 | Diederiks |
| 2011/0298392 A1 | 12/2011 | Goyal |
| 2013/0141009 A1 | 6/2013 | Jin |
| 2013/0191711 A1 | 7/2013 | Tashman |
| 2013/0257315 A1 | 10/2013 | Restrepo |
| 2014/0108019 A1 | 4/2014 | Ehsani |
| 2014/0253483 A1 | 9/2014 | Kupersztoch |
| 2014/0267068 A1 | 9/2014 | Smith |
| 2014/0303841 A1 | 10/2014 | Frojdh et al. |
| 2015/0035776 A1 | 2/2015 | Yamazaki |
| 2015/0077363 A1 | 3/2015 | Yairi |
| 2015/0346702 A1 | 12/2015 | Camden |
| 2016/0043905 A1 | 2/2016 | Fiedler |
| 2016/0054822 A1 | 2/2016 | Suzuki |
| 2016/0140629 A1 | 5/2016 | Kallio |
| 2016/0242264 A1 | 8/2016 | Pakkala |
| 2017/0284618 A1 | 10/2017 | Reynolds |
| 2017/0359190 A1 | 12/2017 | Nadathur |
| 2018/0011561 A1 | 1/2018 | Kawaguchi |
| 2018/0014389 A1 | 1/2018 | Lim Chi Cheung |
| 2018/0070430 A1 | 3/2018 | Edwards |
| 2018/0088770 A1 | 3/2018 | Brombach |
| 2018/0191517 A1 | 7/2018 | Emigh |
| 2018/0228003 A1 | 8/2018 | O'Driscoll |
| 2018/0307362 A1 | 10/2018 | Komala |
| 2019/0042000 A1 | 2/2019 | Kasmieh |
| 2019/0058014 A1 | 2/2019 | Park |
| 2019/0235684 A1 | 8/2019 | Zhang |
| 2019/0280891 A1 | 9/2019 | Pognant |
| 2020/0285316 A1 | 9/2020 | Park |

FOREIGN PATENT DOCUMENTS

| | | |
|---|---|---|
| EP | 2308270 | 4/2011 |
| WO | WO-2014/134637 A2 | 9/2014 |
| WO | WO-2018/129105 | 7/2018 |

OTHER PUBLICATIONS

Control Units—part of. (Design—© Questel) orbit.com [online PDF] 3 pgs. Print Date Jan. 17, 2018. [Retrieved on Oct. 22, 2018] https://sobjprd.questel.fr/export/QPTUJ214/pdf2/3514a93a-3d9f-4c74-8e9c-d17ed033fcb5-173838.pdf.

Office Action and English translation of Office Action dated Dec. 3, 2019, Application CN 201930295209.9, filed Jun. 10, 2019; 3 pages.

Extended European Search Report dated Aug. 10, 2020, Application No. 18735783.5 9 pages.

Coolthings, Brilliant Control Manages Your Smart Home Straight From The Light Switch; Feb. 13, 2017; 2 pgs; https://www.coolthings.com/brilliant-control-smart-home-switch-hub/.

"Brilliant Smart Home Control (1-Switch Panel)—Alexa Built-In & Compatible with Ring, Sonos, Hue, Kasa/TP-Link, Wemo, Smart-Things, Apple HomeKit—In Wall Touchscreen Control for Lights, Music & More", first available Apr. 12, 2018. Amazon.com [https://www.amazon.com/Brilliant-Control-Lighting-Switc (Year: 2018) h-Version/dp/B07C52PJH4?th=1] 10 pages.

* cited by examiner

FACEPLATE FOR MULTI-SENSOR CONTROL DEVICE

RELATED APPLICATIONS

This application claims benefit of priority to Provisional U.S. Patent Application No. 62/957,305, titled FRONT FACE LENS INTEGRATION, filed Jan. 5, 2020; the aforementioned priority application being hereby incorporated by reference in its entirety.

TECHNOLOGICAL FIELD

Embodiments described herein relate to a multi-sensor control device, and more specifically, a faceplate for a multi-sensor control device.

BACKGROUND

Home control systems, such as lighting control systems used for lighting fixtures, include binary analog switches and analog dimmer switches that enable users to control one or more lights wired to an electrical box upon which such switches are connected. Control devices are increasingly more functional, and the incorporation of technological features such as discrete sensor areas can have significant impact on design and aesthetics of such devices.

BRIEF DESCRIPTION OF DRAWINGS

The disclosure herein is illustrated by way of example, and not by way of limitation, in the figures of the accompanying drawings in which like reference numerals refer to similar elements, and in which.

DETAILED DESCRIPTION

Figure 1A:
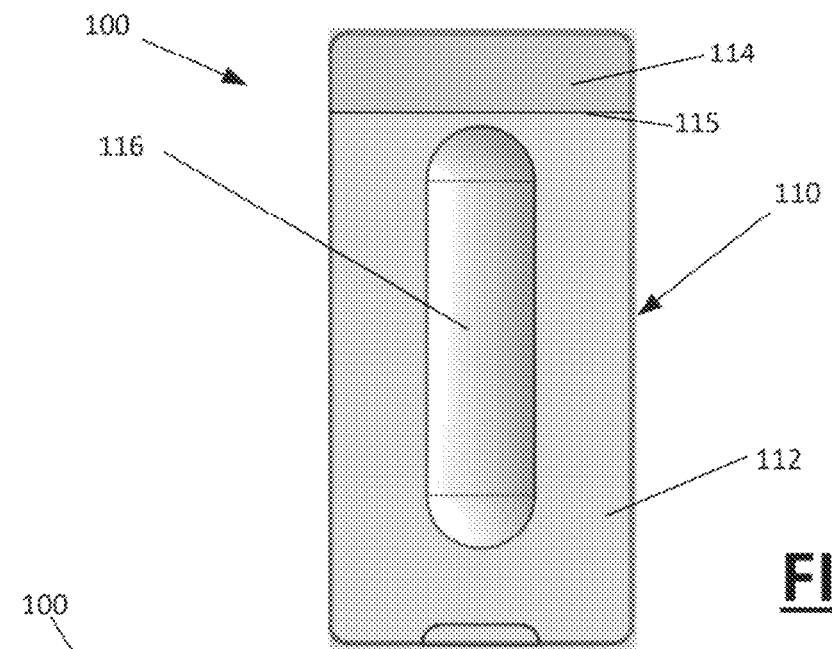
FIG. 1A is a frontal view of a multi-sensor control device having a seamless faceplate, according to one or more examples.

According to examples, a control device includes a faceplate that overlays a control module, where the control module includes multiple types of sensor components. In at least some examples, the control module includes a first type of sensor to detect a touch input on the faceplate, and a second type of sensor to detect passive infrared radiation from an environment of the control device. In variations, other types of sensors may be utilized with the control module. In examples, the faceplate is comprised of multiple types of material, where each type of material is selected for its suitability with regards to enabling the operability of an underlying sensor element of the control module. Moreover, the faceplate is formed such that the different materials are seamlessly joined to form the entirety of the structure. In this way, the faceplate can include multiple regions, with each region being formed of a material that is selected for use with a type of sensor that underlies that region.

According to examples, a faceplate is comprised of two or more different materials that are seamlessly joined when the materials are subjected to a molding and/or curation process (or other manufacturing process) that causes the different materials to bond along a shared boundary.

In some examples, the different portions of the faceplate are seamlessly joined through a molding and curation process. For example, a first region of the faceplate can be formed from a first type of polymeric material, a second region of the faceplate can be formed from a second type of polymeric material, and the first and second regions are seamlessly joined through a molding and curation process to form the entirety of the faceplate.

Generally, under conventional approaches, the use of multiple sensors with alternative material requirements has typically resulted in "hard" design variations to exist in an external facade or housing of a device. Such hard design variations can be aesthetically undesirable, particularly in a dwelling, as such design variations tend to lack design cohesiveness and accentuate manufacturing limitations and functionality over aesthetics. Moreover, the functioning of lens-type sensors can sometimes be misunderstood by users. For example, the presence of a lens for infrared sensors can cause the user to mistake the lens device for a camera, thereby causing some users to have misplaced privacy concerns. Among other advantages, examples as described provide for a control device having a faceplate that is formed from different materials, where the materials are (i) selected to enable operation of underlying sensor elements, and (ii) seamlessly joined, through a manufacturing process, to promote aesthetic design aspects (e.g., cohesive, homogeneity) and mask functionality and manufacturing limitations.

As referenced herein, a unitary structure means a structure that is formed as a result of a manufacturing process, such as a molding and curation process.

Examples also include a control device and faceplate for same. The faceplate includes a first region formed from a first material that is non-conductive, a second region that is formed a second material that is transparent to infrared radiation, and the first region and the second region are seamlessly joined to form a unitary structure.

In examples, a faceplate is formed as a unitary structure from at least two different materials, where each material occupies a respective region of the faceplate. In such examples, the faceplate is formed as a unitary structure that combines the respective regions, such that the respective regions are structurally inseparable without breakage. Still further, as described by various examples, embodiments include a faceplate that is formed as a unitary structure that seamlessly joins a first material of a first region with a second material of a second region.

Control Device with Faceplate

Figure 1B:
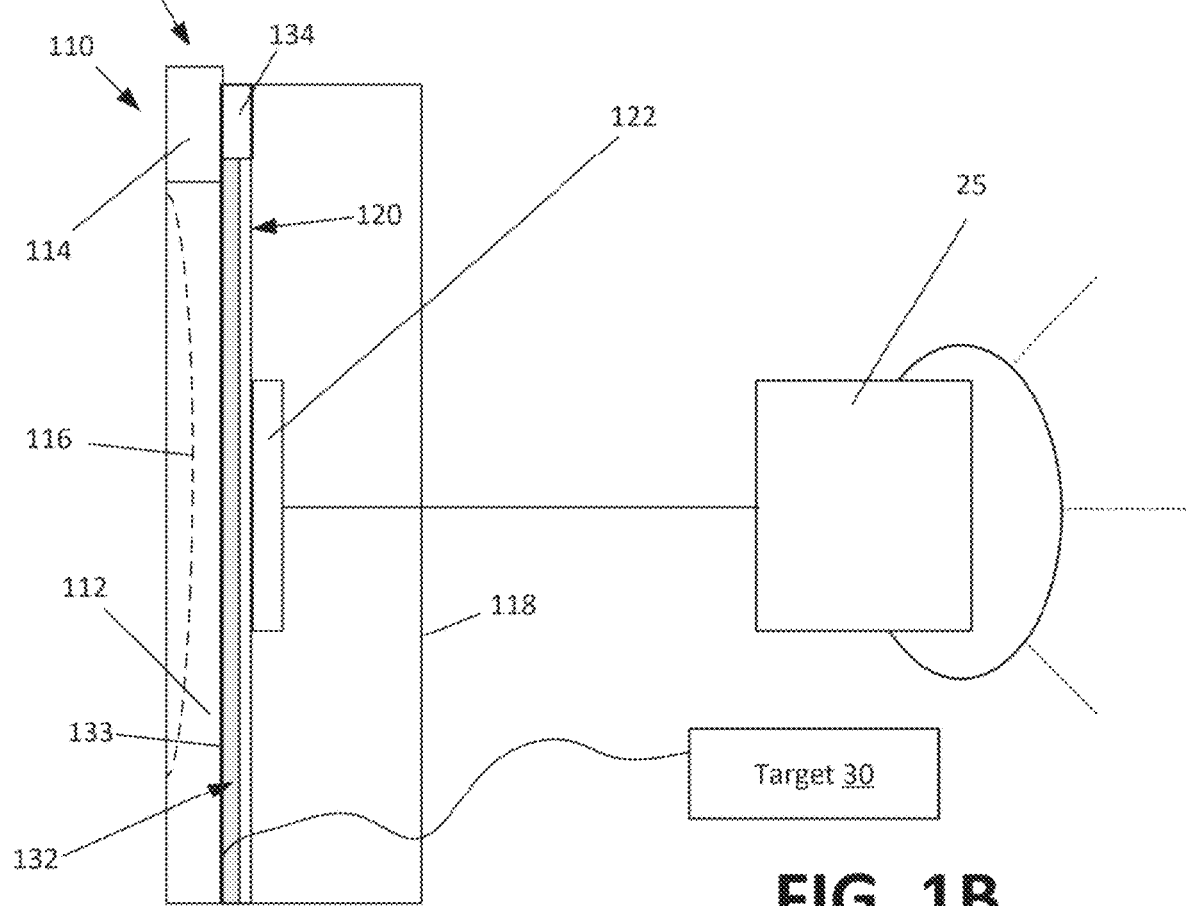
FIG. 1B is a side view of the multi-sensor control device of FIG. 1A, according to one or more examples.

FIG. 1A and FIG. 1B illustrate a control device, according to one or more examples. In examples as shown, the control device 100 is wall-mounted, such as in the form of a light-switch, and is operative to control lights 25 and/or other target devices 30 (e.g., ceiling fan, thermostat, appliance, etc.). The control device 100 can include a faceplate 110, a control module 120, a housing 118 for the control module, and an electrical interface 122. When the controller 100 is mounted and installed, the interface 122 electrically connects to the electrical and switching elements of a dwelling. The control module 120 can be retained within the housing 118, which in turn can be inset within a receptacle of a wall. The faceplate 110 can be mounted over the control module 120, so as to form a façade or shell over the mounted control module 120.

In examples, the control module 120 includes multiple types of sensors, and the control module 120 implements logic to interpret commands or other input from the outputs of each type of sensor. In this way, the control device 100 can, for example, implement switching (e.g., on/off), dimming and other operations of connected light(s) 25 through control of electrical and switching elements. As an addition or variation, the control device 100 can implement operations to control operation of one or more target devices 30. For example, the control device 100 can interpret outputs of one or multiple types of sensors to implement a setting of a target device 30 (e.g., ceiling fan, thermostat, appliance). In communicating with target devices 30, the control device 100 can communicate directly, or indirectly through an intermediary, with the target device 30 using a wireless communication medium (e.g., Bluetooth, WiFi, etc.).

In examples, the control module 120 includes a combination of touch-sensors and a passive infrared sensor (PIR) 134. The faceplate 110 is further structured to overlay each type of sensing element. Accordingly, among other considerations, the materials used for the faceplate 110 are selected to be conducive for the particular type of sensing element that is being overlaid, such that the presence of the faceplate 110 does not make the underlying sensing element inoperative. As described in greater detail, in some examples, the faceplate 110 includes a first or base region 112 that overlays touch-sensing elements, and a second or top region 114 that overlays a PIR sensor, as well as additional touch-sensing elements.

As described with various examples, the use of different types of sensing elements can enhance the functionality provided by the control device 100. For example, in response to detecting the touch-input, the control device 100 can control the operation of a device, or set of devices, in a portion of the dwelling (e.g., room in house). The device or set of devices can include lights 25 and/or other target devices 30 (e.g., ceiling fan, thermostat, connected appliance, etc.). The distribution and/or configuration of the touch-sensing elements can also enable the control module 120 to detect multiple types of touch-inputs (e.g., single-tap, double-tap, swipes, gestures) as different types of commands, which the control module 120 can in turn use to control operation (e.g., power level, setting) of the connected device (e.g., light 25, target device 30). Likewise, in examples, the control device 100 can use a PIR sensor 134 to automatically detect human-presence conditions (e.g., person enters dwelling, person leaves dwelling, no presence of human detected, etc.), and to implement commands that affect the operation of connected lights 25 and/or other target devices 30 based on the detected human-presence condition. In this way, the control module 120 can utilize sensors of various types to enhance the functionality of the control device 100, without sacrificing design and aesthetic objectives for the control device 100.

As an addition or variation, the faceplate 110 can include one or more surface features which enable, facilitate or guide a particular type of input. For example, the faceplate 110 may include an input groove 116 that is formed into a thickness of the faceplate 110. The input groove 116 can be formed as an elongated (e.g., vertically elongated) indentation within the exterior panel 110. In examples, the control module 120 can include sensing elements and control logic to interpret touch-input received within the input groove 116 (e.g., directional swipe along the input groove 116) separately from other regions of the faceplate 110. In variations, the control module 120 can include sensing elements which are dedicated for detecting user-interaction with the input groove 116. In other variations, the control device 100 may not have any input groove or three-dimensional surface feature. For example, the control device 100 may be planar.

With reference to an example of FIG. 1B, control module 120 includes a printed circuit board 132 that electrically interconnects sensing elements of different types. In an example shown, circuit board 132 distributes a layer of touch-sensing elements over an external-facing surface 133 of the circuit board 132. The circuit board 132 also electrically connects to PIR sensor 134 at or near a perimeter end of the circuit board 132. The circuit board 132 and PIR sensor 134 can be packaged or otherwise combined such that the faceplate 110 overlays the circuit board 132 and PIR sensor 134.

The control module 120 can include control logic (not shown) to interpret the outputs of the touch-sensing layer and/or the PIR sensor 134. The control logic can be provided by, for example, a microprocessor positioned on a backside of circuit board 132. In examples, the touch-sensing elements of the circuit board 132 detect "touch" from a user—specifically, by the sensing elements responding to electric field changes resulting from parasitic capacitance that is inherent in human skin. As another example, the PIR sensor 134 can, for example, detect variations in infrared radiation from an environment of the control device 100. The PIR sensor 134 can have, for example, a lens with a characteristic viewing angle from which infrared radiation is detected. According to examples, the control module 120 includes logic to interpret (i) electric field changes that result from human contact with the faceplate 110, and (ii) infrared radiation patterns and/or changes, reflecting, for example, movement of objects in an environment of the control device 100.

By way of example, the control module 120 can use an output of PIR sensor 134 to detect when there is no motion in a living space of a dwelling for a given time interval, and in response to detecting such a condition, the control module 120 controls the lights 25 or other target device(s) 30 to dim or turn-off. Likewise, the control module 120 can use the PIR sensor 134 to detect when an object moves into a room, and in response, control the lights 25 or other target device (s) 30 to turn-on.

According to examples, the faceplate 110 is structured from different materials that are selected to enable functionality of underlying sensor elements. In particular, the faceplate 110 can be formed different types of polymeric material to promote aesthetic design while enabling underlying sensor elements to function properly. The polymeric materials can be seamlessly joined through a manufacturing process such that the resulting facade of the faceplate 110 is cohesive without hard design variations that would other be present and indicative of a change in material and/or underlying sensing function.

In embodiments, a first or base region 112 of the faceplate 110 that overlays touch-sensing elements of the control module 120 can be formed from a non-conductive material, such the material does not interfere with the ability of underlying touch sensors to detect touch input. In some examples, the base region 112 is formed from a polycarbonate or PC/ABS alloy material.

Additionally, in embodiments, the material for a second or top region 114 of the faceplate 110 that overlays the PIR sensor 134 can be selected for its ability to be transparent to infrared radiation. In examples, the material selected for the top region 114 can be both transparent to infrared radiation and substantially opaque (75% or more opaque) to visible light. Additionally, the material selected for the top region 114 can also be selected to share similar non-conduction properties of the material used for the base region 112, so that the material for the top region 114 can also overlay capacitive touch-sensing elements for detecting touch. In some examples, the top region 114 is formed from high-density polyethylene material ("HDPE plastic").

In some examples, the top region 114 of the faceplate 110 can be fabricated into a lens to receive infrared radiation. As an addition or variation, the material of the top region 114 can be structured to overlay touch-sensing elements of the control module 120, so as to overlay both touch-sensing elements and the PIR sensor 134.

The manufacturing process to form the faceplate 110 can provide for the material of the base region 112 and of the second (or top) region 114 to be seamlessly joined through a molding and curation process to form the faceplate 110. For example, top region 114 of the faceplate 110 can be formed by HDPE plastic while the base region 112 can be formed from a polycarbonate material. The materials can be two-shot injection molded into a single part. Following curation, the manufacturing process results in a seamless joinder of the top segment 114 with the first portion 112 to form the entirety of faceplate 110. In this way, the faceplate 110 can then be designed to promote aesthetic themes—for example, the materials may be colored differently to contrast or complement an overall design theme, or the materials may be colored similarly so that the faceplate 110 appears relatively homogenous.

In examples such as shown by FIG. 1A, a boundary 115 can be formed through, for example, an additional manufacturing step to reflect a visual or aesthetic separation between the base region 112 and the top region 114. In this way, the faceplate 110 may be provided with a decorative or intentional groove rather than a material groove that would otherwise be formed under conventional approaches.

Methodology

Figure 2:
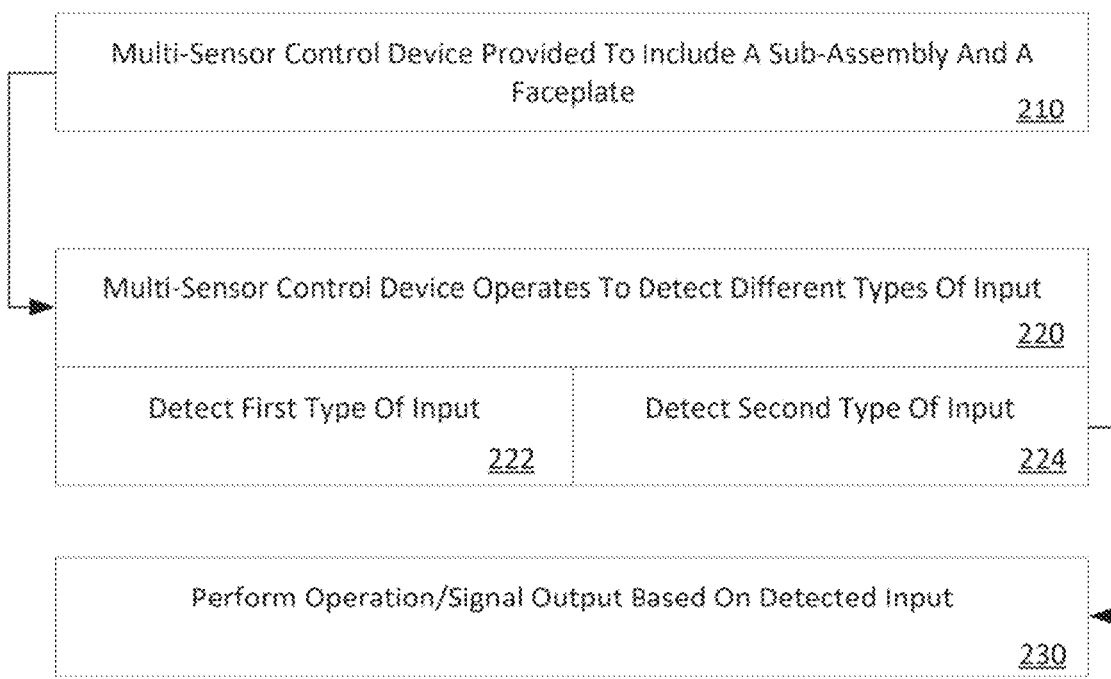
FIG. 2 illustrates a method for operating of a control device such as described with FIG. 1A and FIG. 1B, according to one or more examples.

FIG. 2 illustrates an example method for operating of a control device, according to one or more examples. In describing an example method of FIG. 2, reference may be made to elements of examples of FIG. 1A and FIG. 1B for purpose of illustrating suitable components or elements for performing a step or sub-step being described.

With reference to FIG. 2, a multi-sensor control device is provided to include a control module 120 and a faceplate 110 (210). The control module 120 and the faceplate 110 can be assembled to form the control device 100. In some examples, the control device 100 is assembled as a wall-mounted device, such as a light switch or similar wall-mounted device of a dwelling. For example, the control module 120 can be installed within a receptacle of a wall, with the electrical interface 122 being connected to an external electrical line (e.g., main of a dwelling). The faceplate 110 can then be mounted over the control module 120, with base region 112 aligned over a first portion of the control module 120, and top region 114 aligned over a second portion of the control module 120.

When installed and made operational, the control device 100 is operable to detect different types of input (220). The control device 100 can detect a first type of input using sensor input that is detected by touch-sensors of control module 120, where the touch-sensors are provided under the base region 112 of the faceplate 110 (222). Additionally, the control device 100 can detect a second type of input using sensor input that is detected by PIR 134 (224). In such examples, the PIR 134 can detect indirect or passive input, such as presence input of persons (or animals) within a predefined range of the PIR 134.

In response to detecting an input, the control device 100 performs an operation, or otherwise signals an output based on a detected input (230). For example, the control device 100 can implement a control operation in response to detecting a touch input. Additionally, attributes of the touch input (e.g., location where touch input was received, duration or length of touch input, gesture provided, etc.) can be detected and interpreted to power or control a connected device, change or update a setting (e.g., power level, operational mode), and/or to select a device to control. Likewise, the control device 100 can implement a control operation or output in response to an output of the 134. For example, the control device 100 can use an output of the 134 to power on a connected light 25 or target device 30 based on an output of the PIR 134 being indicative of a person being in proximity to the control device 100.

Faceplate for Wall-Mountable Control Device

Figures 3A, 3B:
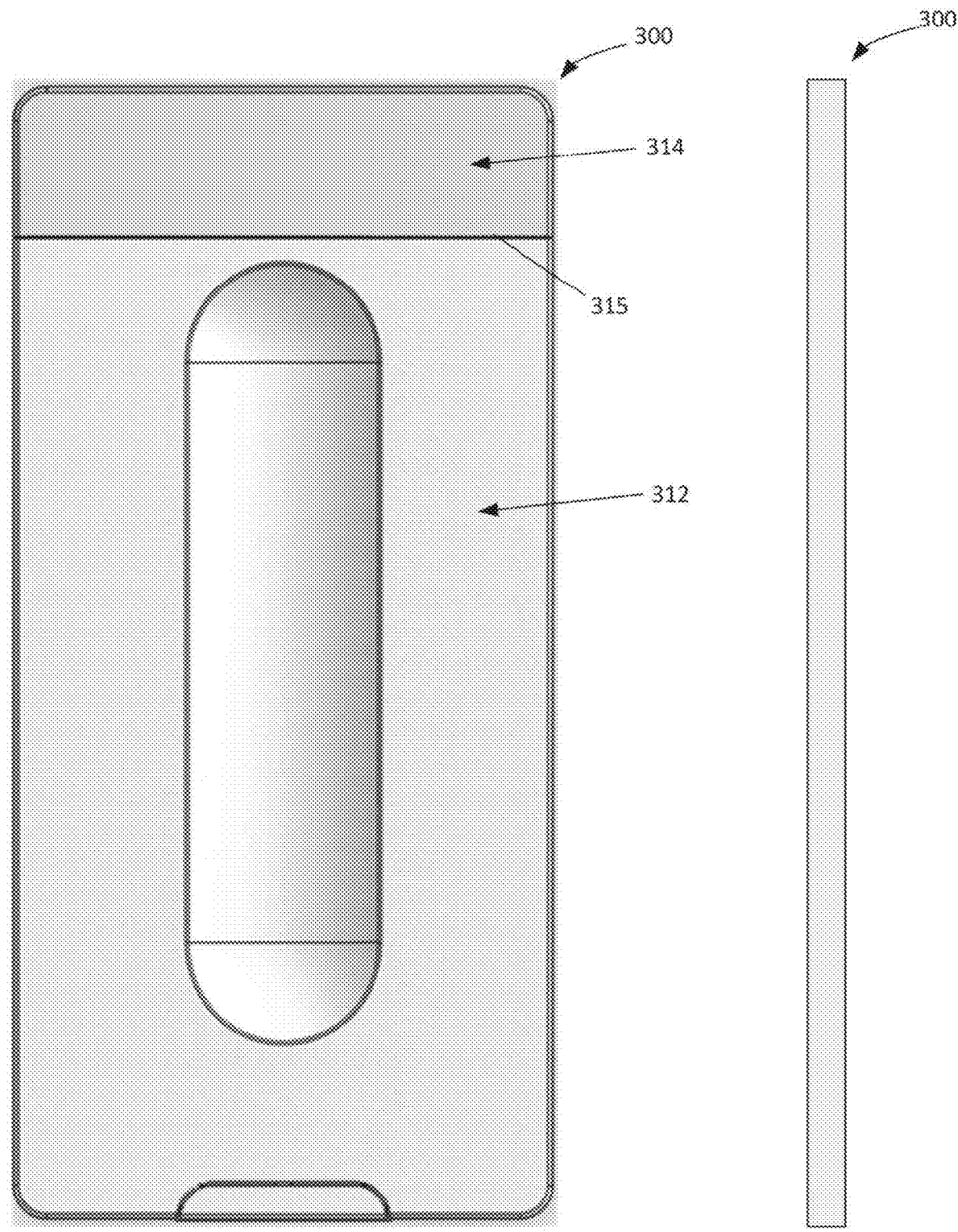
FIG. 3A illustrates a frontal view of a faceplate for a wall-mountable control device, according to one or more examples.
FIG. 3B illustrates a side view of a faceplate of FIG. 3A, according to one or more examples.

FIG. 3A illustrates a frontal view of a faceplate for a wall-mountable control device, according to one or more examples. FIG. 3B illustrates a side view of a faceplate of FIG. 3A, according to one or more examples. A faceplate 300, as shown with FIG. 3A and FIG. 3B, may be manufactured/sold separately from, for example, a control device 100 or portions thereof (e.g., control module 120). For example, the 300 can be provided as a replacement or retrofit for a wall-mounted control device. In examples, the faceplate 300 is structured in accordance with examples described with FIG. 1A and FIG. 1B, and as described with faceplate 110 and/or other examples described herein.

With further reference to FIG. 3A and FIG. 3B, faceplate 300 includes a base region 312 and a top region 314. The base region 312 can be formed from non-conductive material, such as polycarbonate or PC/ABS alloy material. The material selected for the top region 114 can be transparent to infrared radiation. Additionally, in some variations, the material selected for the top region 114 can be substantially opaque (75% or more opaque) to visible light. For example, the top region 114 can be formed from high-density polyethylene material ("HDPE plastic"). In examples, the base region 312 and the top region 314 form a unitary structure. The base region 312 and top region 314 can be seamlessly joined through a manufacturing process. For example, the materials of the base region 312 and the top region 314 can be formed through an injection molding process (e.g., two-shot injection molding process) to form a unitary structure.

Further, in some examples, the unitary structure can be subject to an additional process to form an aesthetic border 315 that visually separates the base region 312 from the top region 314. The aesthetic border 315 can, for example, be in the form of a decorative or superficial groove.

Conclusion

It is contemplated for embodiments described herein to extend to individual elements and concepts described herein, independently of other concepts, ideas or devices, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A control device comprising:
   a faceplate; and
   a control module, the control module including a touch sensor to detect touch inputs on the faceplate, and a passive infrared sensor to detect passive infrared radiation from an environment of the control device;
   wherein the faceplate is comprised of a first type of material over a first portion of the faceplate and a second type of material over a second portion of the faceplate, the second type of material being transparent to infrared radiation to enable the passive infrared sensor to detect the passive infrared radiation; and
   wherein the first portion and second portion of the faceplate are seamlessly joined.

2. The control device of claim 1, the second type of material is formed into a lens to receive infrared radiation.

3. The control device of claim 1, wherein the first type of material and the second type of material are seamlessly joined through a molding and curation process.

4. The control device of claim 1, wherein each of the first and second type of materials are polymeric materials.

5. The control device of claim 1, wherein the first type of material is a polycarbonate material or a PC/ABS alloy material, and the second type of material is a high-density polyethylene material.

6. The control device of claim 1, wherein the control module includes a printed circuit board, wherein the touch sensor includes a plurality of sensing elements distributed over an area of the printed circuit board to detect touch-contact with the faceplate, and wherein the infrared sensor is electrically connected to the printed circuit board.

7. The control device of claim 1, wherein the control device is operable as a wall-mounted light switch.

8. A control module for a wall-mountable control device, the control module comprising:
   a touch sensor to detect touch inputs on a faceplate; and
   a passive infrared sensor to detect passive infrared radiation from an environment of the wall-mountable control device;
   wherein the faceplate comprises:
      a first region formed from a first material that is non-conductive;
      a second region that is formed a second material that is transparent to infrared radiation to enable the passive infrared sensor to detect the passive infrared radiation;
   wherein the first region and the second region form a unitary structure.

9. The control module of claim 8, wherein the first region and the second region are seamlessly joined.

10. The control module of claim 8, wherein the faceplate includes an aesthetic border that visually separates the first region from the second region.

11. The control module of claim 10, wherein the aesthetic border is structured as a decorative groove that is formed into the unitary structure.

12. The control module of claim 8, wherein the second material is substantially opaque to visible light.

13. The control module of claim 8, wherein the second material is non-conductive.

14. The control module of claim 8, wherein the first region includes an input groove.

* * * * *